(12) United States Patent
Fukata et al.

(10) Patent No.: US 8,971,662 B2
(45) Date of Patent: Mar. 3, 2015

(54) IMAGE PROCESSING APPARATUS, IMAGE PROCESSING METHOD, AND RECORDING MEDIUM

(71) Applicant: Sony Corporation, Tokyo (JP)

(72) Inventors: Yoko Fukata, Tokyo (JP); Toshiki Ono, Tokyo (JP); Masanori Mikami, Kanagawa (JP)

(73) Assignee: Sony Corporation (JP)

( * ) Notice: Subject to any disclaimer, the term of this patent is extended or adjusted under 35 U.S.C. 154(b) by 116 days.

(21) Appl. No.: 13/743,845

(22) Filed: Jan. 17, 2013

(65) Prior Publication Data
US 2013/0195374 A1 Aug. 1, 2013

(30) Foreign Application Priority Data

Jan. 26, 2012 (JP) ................................ 2012-013921

(51) Int. Cl.
*G06K 9/20* (2006.01)
*G06T 11/60* (2006.01)

(52) U.S. Cl.
CPC ...................................... *G06T 11/60* (2013.01)
USPC ....................................................... 382/282

(58) Field of Classification Search
None
See application file for complete search history.

(56) References Cited

U.S. PATENT DOCUMENTS

| | | | | |
|---|---|---|---|---|
| 5,781,665 A * | 7/1998 | Cullen et al. | ................... | 382/254 |
| 5,960,126 A * | 9/1999 | Nielsen et al. | ................ | 382/298 |
| 6,654,506 B1 * | 11/2003 | Luo et al. | ....................... | 382/282 |
| 6,829,432 B2 * | 12/2004 | Misumi et al. | ..................... | 396/1 |
| 6,907,136 B1 * | 6/2005 | Shigemori | ..................... | 382/118 |
| 7,738,735 B2 * | 6/2010 | Kotani | ........................... | 382/297 |
| 8,116,535 B2 * | 2/2012 | Nozawa | ......................... | 382/118 |
| 8,139,826 B2 * | 3/2012 | Ryuto et al. | ................... | 382/118 |
| 8,406,515 B2 * | 3/2013 | Cheatle | ......................... | 382/164 |
| 8,538,074 B2 * | 9/2013 | Nakamura et al. | ............. | 382/103 |
| 2009/0161961 A1 * | 6/2009 | Kim et al. | ...................... | 382/195 |
| 2010/0156931 A1 * | 6/2010 | Boreham et al. | .............. | 345/621 |
| 2011/0007187 A1 | 1/2011 | Mori et al. | | |
| 2011/0305397 A1 * | 12/2011 | Piramuthu et al. | ............ | 382/199 |

FOREIGN PATENT DOCUMENTS

| | | |
|---|---|---|
| JP | 2009-089220 A | 4/2009 |
| JP | 2009-218807 A | 9/2009 |

\* cited by examiner

*Primary Examiner* — Bhavesh Mehta
*Assistant Examiner* — Feng Niu
(74) *Attorney, Agent, or Firm* — Lerner, David, Littenberg, Krumholz & Mentlik, LLP (57) ABSTRACT

An image processing apparatus to generate a trimming image from an input image. The apparatus including a central processing unit (CPU) programmed such that during operation, when a first trimming region in which an object included in an input image is arranged with a first composition is beyond a range of the input image, sets a second trimming region in which the object is arranged with a second composition. One of the first composition or the second composition is a three division composition and the other of the first composition or the second composition is a two division composition.

14 Claims, 10 Drawing Sheets

IMAGE PROCESSING APPARATUS, IMAGE PROCESSING METHOD, AND RECORDING MEDIUM

CROSS-REFERENCE TO RELATED APPLICATION

The present application claims priority from Japanese Patent Application No. JP 2012-013921 filed in the Japanese Patent Office on Jan. 26, 2012, the entire content of which is incorporated herein by reference.

BACKGROUND

The present disclosure relates to an image processing apparatus, an image processing method, and a recording medium.

Recently, imaging apparatuses such as digital still cameras that automatically adjust focusing or exposure have spread. In such an imaging apparatus, focusing or exposure suitable for a photographing scene is set and a user can acquire a superior imaged image, even though the user does not adjust the focusing or the exposure.

In addition, technologies for automatically setting a composition of an imaged image without depending on an operation from a user, for example, technologies disclosed in Japanese Patent Application Laid-Open Nos. 2009-89220 and 2009-218807 have been suggested. According to these technologies, a size or a position of a face of an object is detected and an appropriate region of the imaged image is cut as a trimming image, on the basis of the size or the position.

SUMMARY

However, according to the technologies disclosed in Japanese Patent Application Laid-Open Nos. 2009-89220 and 2009-218807, when a region of a set trimming image is beyond a range of the imaged image, a composition is not set. Therefore, if an object is largely displayed or is displayed at an end of an image, the composition may not be set. Even in this case, the user may desire to automatically set the composition. However, the technologies do not sufficiently meet the desire.

It is desirable to provide an image processing apparatus, an image processing method, and a program that enable availability of automatic setting of a composition to be enhanced.

According to an embodiment of the present disclosure, there is provided an image processing apparatus including a composition setting unit that, when a first trimming region in which an object included in an input image is arranged with a first composition is beyond a range of the input image, sets a second trimming region in which the object is arranged with a second composition.

Further, according to an embodiment of the present disclosure, there is provided an image processing method including, when a first trimming region in which an object included in an input image is arranged with a first composition is beyond a range of the input image, setting a second trimming region in which the object is arranged with a second composition.

Further, according to an embodiment of the present disclosure, there is provided a computer readable recording medium on which a program is recorded. The program causes a computer to realize a function of, when a first trimming region in which an object included in an input image is arranged with a first composition is beyond a range of the input image, setting a second trimming region in which the object is arranged with a second composition.

According to the configuration described above, even when the first set trimming region is beyond the range of the input image, the possibility of a trimming region settled within the range of the input image being generated by a different method becomes high. Therefore, automatic setting of a composition can be used in many cases.

According to the embodiments of the present disclosure described above, availability of automatic setting of a composition can be enhanced.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.

1. First Embodiment
1-1. Functional Configuration
1-2. Process Flow
1-3. Setting Example of Trimming Region
2. Second Embodiment
3. Supplement In the following description, first and second embodiments of the present disclosure according to a digital still camera that is an example of an image processing apparatus will be disclosed. The image processing apparatus according to the embodiments of the present disclosure is not limited to the digital still camera and may be any one of various apparatuses that have a function of processing an input image and generating a trimming image. The embodiments of the present disclosure include a method of processing an input image and generating a trimming image, a program for causing a computer to realize a function of processing an input image and generating a trimming image, and a computer readable recording medium on which the program is recorded.

1. First Embodiment

1-1. Functional Configuration

Figure 1:
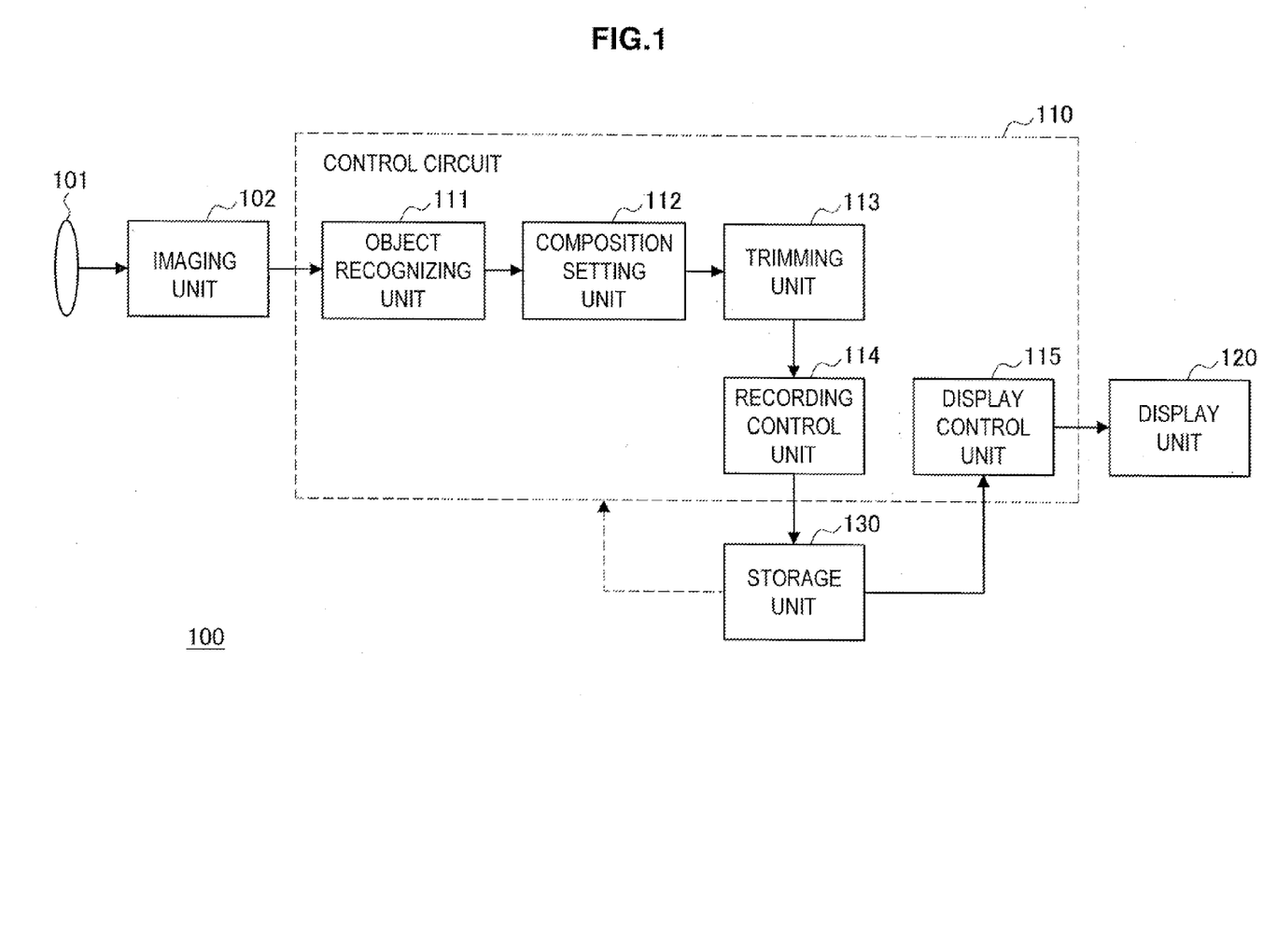
FIG. 1 is a schematic block diagram illustrating a functional configuration of a digital still camera according to a first embodiment of the present disclosure.

First, a functional configuration of a digital still camera according to a first embodiment of the present disclosure will be described with reference to FIG. 1. FIG. 1 is a schematic block diagram illustrating a functional configuration of a digital still camera 100 according to the first embodiment.

The digital still camera 100 includes an imaging optical system 101, an imaging unit 102, a control circuit 110, a display unit 120, and a storage unit 130. The control circuit 110 realizes functions of an object recognizing unit 111, a composition setting unit 112, a trimming unit 113, a recording control unit 114, and a display control unit 115. In addition to the functional configuration illustrated in FIG. 1, the digital still camera 100 includes a structural element such as an operation unit that is generally provided in the digital still camera.

The imaging optical system 101 includes optical components such as various lenses such as a focus lens and a zoom lens, an optical filter, and a diaphragm. An optical image (object image) that is incident from an object is formed on an exposure surface of an imaging element included in the imaging unit 102, through the optical components included in the imaging optical system 101.

The imaging unit 102 includes an imaging element such as a charge coupled device (CCD) and a complementary metal oxide semiconductor (CMOS), a timing generator to drive the imaging element, and a signal processing circuit. The signal processing circuit processes an analog image signal output when the imaging element executes photoelectric conversion on the object image, converts the analog image signal into a digital image signal, and outputs the digital image signal to the control circuit 110. The signal processing circuit is realized by a digital signal processor (DSP).

The control circuit 110 realizes the functions of the object recognizing unit 111, the composition setting unit 112, the trimming unit 113, the recording control unit 114, and the display control unit 115 and controls operations of the individual units of the digital still camera 100. The control circuit 110 is realized by a central processing unit (CPU) that operates on the basis of a program stored in the storage unit 130 and realizes the functions described above. A part or all of the functions of the control circuit 110 may be realized by the DSP, similar to the signal processing circuit. Hereinafter, the individual functional units that are realized by the control circuit 110 will be described.

The object recognizing unit 111 analyzes a digital image signal of an input image acquired from the imaging unit 102 and recognizes an object included in the input image. In this case, the object is a face of a person. In addition, the object may be any one of various objects such as a face of an animal, a flower, and a dish. The object recognizing unit 111 calculates a region of the object using an algorithm such as wavelet transform or Haar feature detection. For example, in the case of the face of the person, the region of the object may be a coordinate value of a smallest rectangular shape in which a jaw, ears, and eyebrows are included. The region of the object is not limited to the rectangular shape and may have a triangular shape or an elliptical shape. The object recognizing unit 111 may recognize a direction of the object in addition to the region of the object.

The composition setting unit 112 sets a trimming region of the input image, such that the object is arranged with a predetermined composition. In this embodiment, the composition setting unit 112 uses a three division composition as a predetermined composition. The predetermined composition may be a different composition such as a two division composition. As will be described below, the composition setting unit 112 may use a plurality of types of compositions together. The composition setting unit 112 sets a trimming region according to a position, a size, and a direction of the object recognized by the object recognizing unit 111. Specifically, the composition setting unit 112 determines a size of the trimming region according to the size of the object and determines a position of the trimming region such that the object is arranged at any one of intersections obtained by dividing the trimming region by three. The composition setting unit 112 provides information of the set trimming region to the trimming unit 113.

In this case, the composition setting unit 112 first attempts to set a first trimming region in which the object is arranged with a first composition, as a process of setting the trimming region. When the first trimming region is within a range of the input image, the composition setting unit 112 provides information of the first trimming region to the trimming unit 113, because the input image can be trimmed as it is. Meanwhile, when the first trimming region is beyond the range of the input image, the composition setting unit 112 attempts to set a second trimming region, because the input image may not be trimmed as it is. In the second trimming region, the object is arranged with a second composition. When the second trimming region is within the range of the input image, the composition setting unit 112 provides information of the second trimming region to the trimming unit 113.

Because the second trimming region is set when the first trimming region is beyond the range of the input image, the second trimming region is preferably smaller than the first trimming region. Alternatively, the second trimming region may be a region that is obtained by changing a vertical length and a horizontal length, and an aspect ratio of the first trimming region. The composition setting unit 112 may set the first composition and the second composition to different types of compositions (for example, a three division composition is used as the first composition and a two division composition is used as the second composition) and set the second trimming region.

The composition setting unit 112 may repetitively execute resetting a process of the trimming region until a newly set trimming region is settled within the range of the input image. That is, when the second trimming region is beyond the range of the input image, the composition setting unit 112 may set a third trimming region in which the object is arranged with a third composition. The process of the composition setting unit 112 described above will be further described below with reference to a process flow and setting examples of the trimming region.

The trimming unit 113 generates a trimming image of the trimming region set by the composition setting unit 112, from the input image. At this time, the trimming unit 113 may increase a size of the trimming image to a size of the input image by performing a process of pixel interpolation to increase resolution (super-resolution process). As will be described below, it is possible for the composition setting unit 112 even to expand the size of the trimming image to the size of the input image by the process, and the composition setting unit 112 may use it as a repetition condition of the resetting process of the composition.

The recording control unit 114 records the trimming image generated by the trimming unit 113 as image data in the storage unit 130. The recording control unit 114 may record the trimming image and image data of the input image.

The display control unit 115 displays the image recorded as the image data in the storage unit 130 on the display unit 120. The display control unit 115 may display an image as a previous image, after imaging is executed by the digital still camera 100, and display any image recorded in the storage unit 130 as a reproduction image, in accordance with an operation from a user.

The display unit 120 is configured using a liquid crystal display (LCD) or an organic electro-luminescence (EL) display. The display unit 120 displays a variety of information regarding the digital still camera 100 for the user in accordance with control of the display control unit 115.

A variety of data regarding a process of the digital still camera 100 is stored in the storage unit 130. The storage unit 130 may be a semiconductor memory such as a flash read only memory (ROM) or a dynamic random access memory (DRAM), an optical disk such as a digital versatile disc (DVD) or a compact disk (CD), or a hard disk. Alternatively, the storage unit 130 may be a storage device embedded in the digital still camera 100 or a recording medium removable from the digital still camera 100. The storage unit 130 may include a plurality of types of storage devices or recording media. The image data of the input image or the trimming image is stored in the storage unit 130 by the recording control unit 114. In addition, a program for causing the CPU of the control circuit 110 to execute the functions may be stored in the storage unit 130.

1-2. Process Flow

Figure 2:
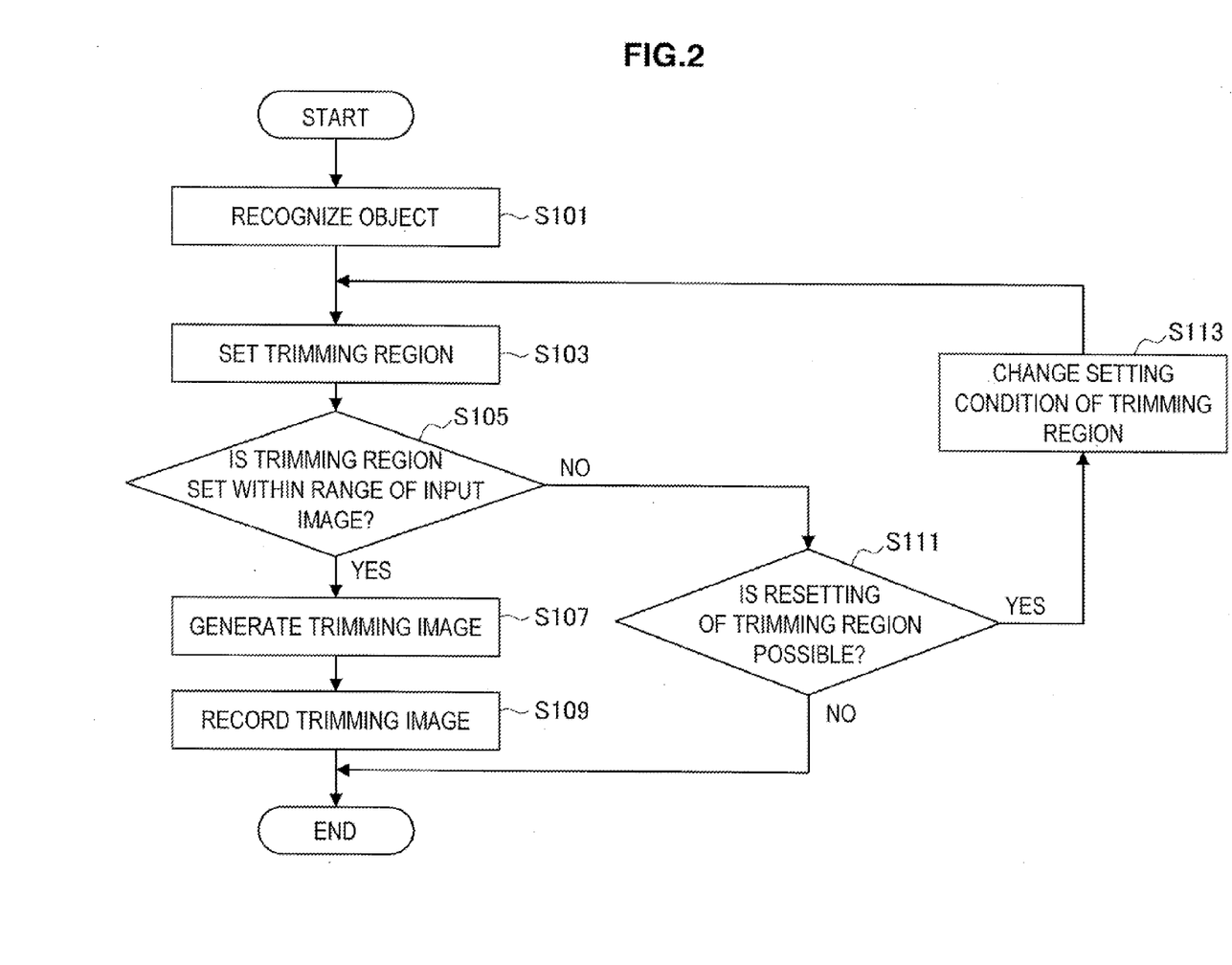
FIG. 2 is a flowchart illustrating a process of the digital still camera according to the first embodiment of the present disclosure.

Next, a process flow of the digital still camera according to the embodiment of the present disclosure will be described with reference to FIG. 2. FIG. 2 is a flowchart illustrating a process of the digital still camera 100.

In the process illustrated in FIG. 2, first, the object recognizing unit 111 analyzes a digital image signal of the input image acquired from the imaging unit 102 and recognizes the object included in the input image (S101). Next, the composition setting unit 112 sets the trimming region such that the object is arranged with a predetermined composition, according to the position, the size, and the direction of the object recognized by the object recognizing unit 111 (step S103). In this case, the set trimming region corresponds to the first trimming region described above.

The composition setting unit 112 determines whether the trimming region is set within the range of the input image (step S105). In this case, when it is determined that the trimming region is set within the range of the input image, the trimming unit 113 generates the trimming image from the input image according to the set trimming region (step S107) and the recording control unit 114 records the trimming image in the storage unit 130 (step S109).

Meanwhile, when it is determined in step S105 that the trimming region is not set within the range of the input image, the composition setting unit 112 determines whether the trimming region can be reset (step S111). The determination may be a determination on whether the trimming unit 113 can increase the size of the trimming image of the reduced trimming region to the size of the input image, when the trimming region is reduced by the resetting, as described above. The determination may be a determination on whether the number of times of resetting the trimming region reaches the predetermined number of times.

When it is determined in step S111 that the trimming region can be reset, the composition setting unit 112 changes a setting condition of the trimming region (step S113). The change of the setting condition may be a change of a parameter when the size of the trimming region is set according to the size of the object or a change of a type of the used composition. The detailed description of the changed setting condition will be given below.

Next, the composition setting unit 112 resets the trimming region in accordance with the setting condition changed in step S113 (step S103). In this case, the set trimming region corresponds to the second trimming region described above.

Meanwhile, when it is determined in step S111 that the trimming region may not be reset, the composition setting unit 112 ends the process without setting the trimming region. In this case, the trimming unit 113 does not generate the trimming image. Therefore, the recording control unit 114 does not record the trimming image in the storage unit 130.

1-3. Setting Example of Trimming Region

Figure 3A:
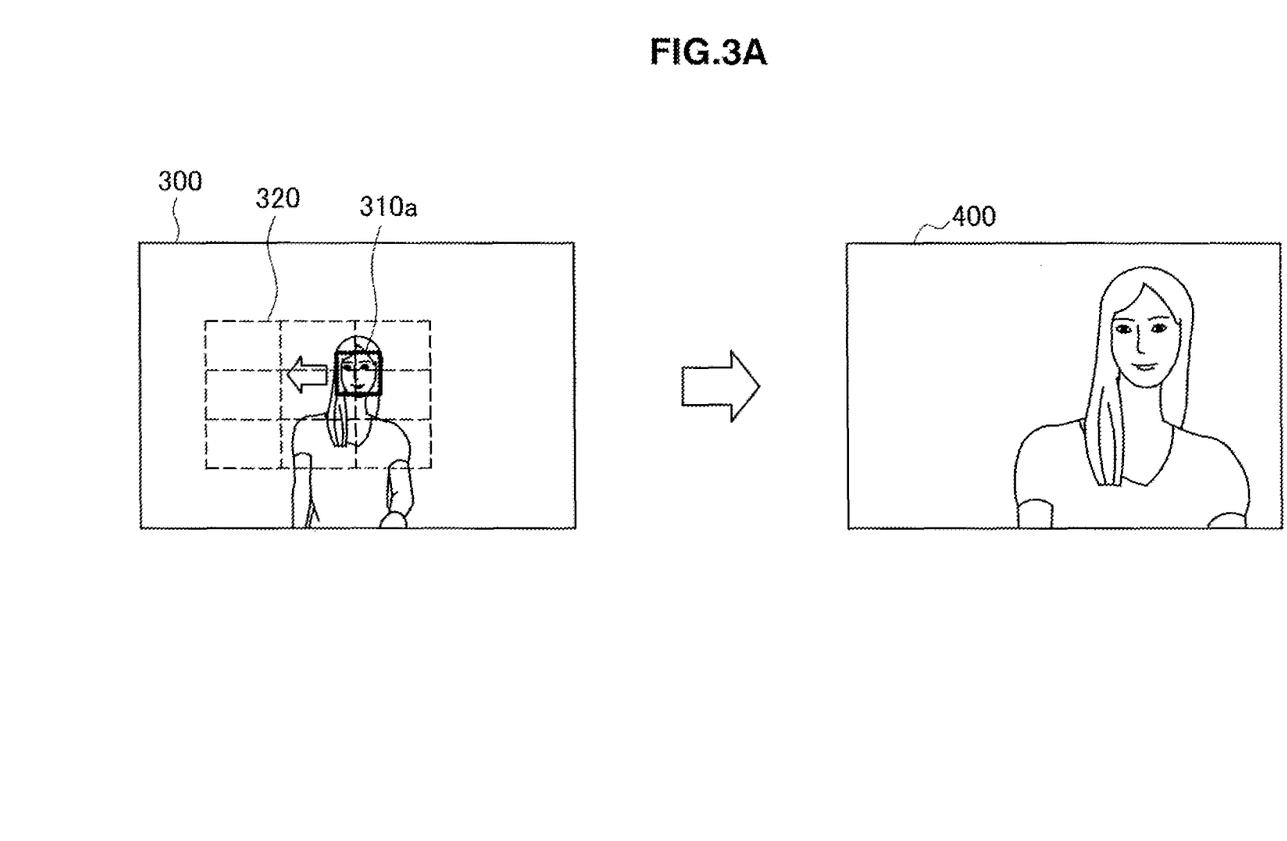
FIG. 3A is a diagram illustrating an example of trimming region setting.
Figure 3B:
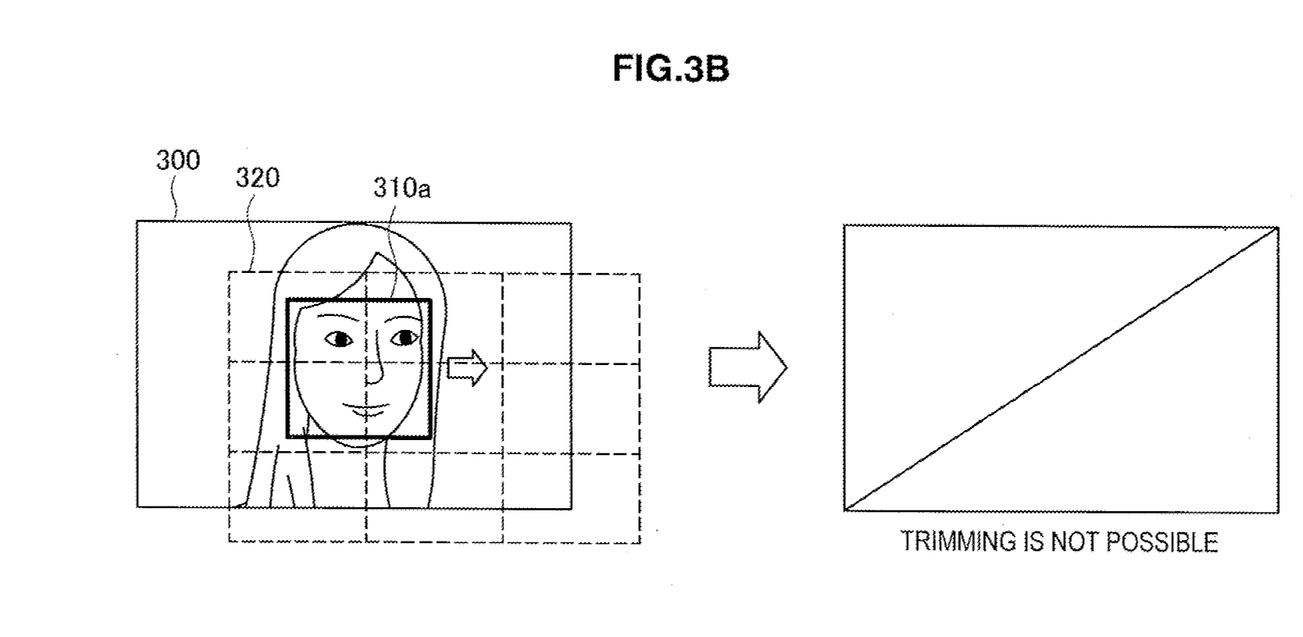
FIG. 3B is a diagram illustrating an example of trimming region setting.

Next, setting examples of a trimming region in the digital still camera according to the first embodiment of the present disclosure will be described with reference to FIGS. 3A to 7B. FIGS. 3A and 3B are diagrams illustrating general examples of trimming region setting. FIGS. 4A to 7B are diagram illustrating setting examples of the trimming region in the digital still camera 100.

FIG. 3A is a diagram illustrating an example of the case in which the trimming region can be set. In the example illustrated in FIG. 3A, the object recognizing unit 111 recognizes a face of a person as an object included in an input image 300. The face of the person may be recognized as a face region 310a. A position and a size of the object in the input image 300 are shown by the face region 310a. The object recognizing unit 111 analyzes an image of a portion of the face region 310a and recognizes a direction of the face to be the object.

The composition setting unit 112 sets a trimming region 320, according to the position, the size, and the direction of the object recognized by the object recognizing unit 111. For example, the composition setting unit 112 first determines whether the trimming region is made to become vertically long or horizontally long, according to the direction of the object. In the example illustrated in FIG. 3A, because the face shown by the face region 310a turns to the left side, the composition setting unit 112 makes the trimming region become horizontally long.

Next, the composition setting unit 112 determines a size of the trimming region 320, according to a size of the face region 310a. In the example illustrated in FIG. 3A, the composition setting unit 112 sets the width of the trimming region 320 to the width n (n≥2) times larger than the width of the face region 310a.

The composition setting unit 112 determines the position of the trimming region 320, such that the object is arranged at a predetermined position at which the object is arranged with a predetermined composition. For example, in the case of the three division composition, the position at which the object is arranged is any one of four intersections of lines that divide the trimming region 320 by three in each of horizontal and vertical directions. The composition setting unit 112 determines the position at which the object is arranged, on the basis of the direction of the object.

In the present disclosure, an overall state of an object arrangement in the trimming region is called a "composition". The "composition" is defined by a type of the composition (for example, three division composition or two division composition), a relative size (value of n) of the object with respect to the trimming region, and an arrangement point of the object (in the case of the three division composition, an intersection at which the object is arranged, among the four intersections) in the above example.

In the example of FIG. 3A, the trimming region 320 that is set as described above is within the range of the input image 300. Therefore, a trimming image 400 in the trimming region 320 is generated by the trimming unit 113.

Meanwhile, in the example of FIG. 3B, the trimming region 320 that is set in the same way as the case of FIG. 3A is beyond the range of the input image 300. Therefore, in this state, the trimming image 400 is not generated.

In the setting process of the trimming region illustrated in FIGS. 3A and 3B, if the face region 310a is large or the face region 310a is positioned at an end of the input image 300, the trimming image 400 is not generated. Therefore, an imaged image may not be trimmed and the image may not be stored with an appropriate composition.

In the case like FIG. 3B, a method of ignoring a portion of the trimming region 320 beyond the range of the input image 300 and generating the trimming image may be considered. However, even in this case, because the trimming image is not matched with the set composition, the imaged image is not necessarily stored with an appropriate composition.

In addition, in the generation process of the trimming image illustrated in FIG. 3A, the trimming image can be generated. However, because a relation between the size of the trimming region 320 and the size of the face region 310a is fixed, most of objects are relatively small even though trimming images are generated from different input images. As a result, the user may have an impression that a change of the composition is poor and there is lack of originality.

Therefore, in this embodiment, in the case like FIG. 3B, the composition setting unit 112 changes the setting condition of the trimming region and attempts to set a new trimming region. The change of the setting condition of the trimming region may be a change of a value of n when the size of the trimming region 320 is set and arranging the object at a different intersection in the three division composition in the above example. Alternatively, the composition setting unit 112 may change a type of the composition as the change of the trimming setting condition. For example, instead of the three division composition, the two division composition may be used.

In this way, if a new trimming region is set in accordance with a different setting condition and the trimming region is within the range of the input image 300, a trimming image can be generated even when the trimming image may not be generated by the process like the examples of FIGS. 3A and 3B. In the trimming image generated as described above, because the size of the object is changed by the input image of the generation origin, the user may have an impression that a change of the composition is rich and originality is rich.

Hereinafter, some examples of trimming region setting in this embodiment will be described.

First Example

Figure 4A:
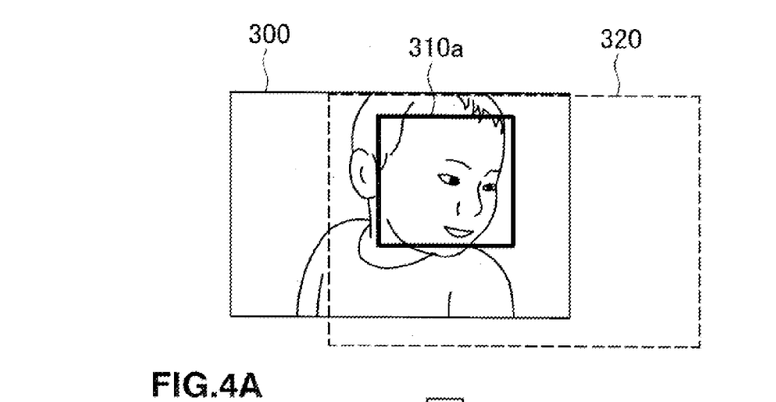
FIGS. 4A to 4C are diagrams illustrating a first example of trimming region setting in the first embodiment of the present disclosure.
Figure 4B:
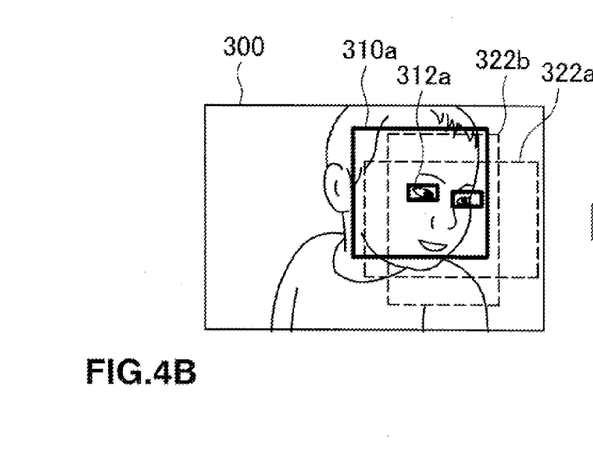
Figure 4C:
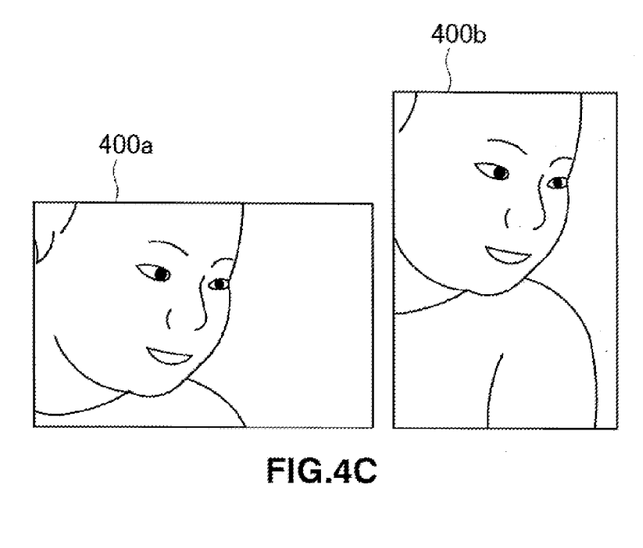

FIGS. 4A to 4C are diagrams illustrating a first example of trimming region setting in this embodiment. As illustrated in FIG. 4A, first, the composition setting unit 112 sets a first trimming region 320 in which a face region 310a of an object included in an input image 300 is arranged with a three division composition. However, the first trimming region 320 is beyond a range of the input image 300.

Therefore, the composition setting unit 112 sets a second trimming region 322, as illustrated in FIG. 4B. In the example illustrated in FIG. 4B, the composition setting unit 112 reduces the first trimming region 320 to set the second trimming region 322.

For example, the composition setting unit 112 may decrease the value of n used when the size of the trimming region is set in the example of FIG. 3A and reduce the trimming region. The value of n is set to n≥2 in the example of FIG. 3A. However, in setting process of the second trimming region 322, the value of n may be set to n<2 or n<1. That is, the composition setting unit 112 may reduce the first trimming region 320 to the degree that a part of the face region 310a is not included.

In this case, a reduction range of the first trimming region 320 may be arbitrarily set. However, the composition setting unit 112 may reduce the first trimming region 320, such that an eye region 312a of the face region 310a is included. The eye region 312a is a gaze region that is considered as a region which an observer of an image gazes at in particular, in the face region 310a. The eye region 312a may be specified using the same algorithm as an algorithm used by the object recognizing unit 111 or a recognition result of the object recognizing unit 111. The gaze region is not limited to the eye region exemplified in the drawings and may be another organ included in the face region 310a.

The first trimming region 320 is illustrated as a horizontally long region. However, the second trimming region 322 may be either a horizontally long region or a vertically long region. For example, the composition setting unit 112 may switch a shape of the second trimming region 322 to a horizontally long shape or a vertically long shape in accordance with a feature of the object. In FIG. 4B, a second trimming region 322a to be horizontally long and a second trimming region 322b to be vertically long are illustrated. In this example, because both the trimming regions are within the range of the input image 300, both a trimming image 400a to be horizontally long and a trimming image 400b to be vertically long can be generated, as illustrated in FIG. 4C.

In the example illustrated, both the second trimming region 322a to be horizontally long and the second trimming region 322b to be vertically long are within the range of the input image 300. However, when only one of the second trimming regions 322a and 322b is within the range of the input image 300, the composition setting unit 112 may select the second trimming region 322 within the range of the input image 300. The composition setting unit 112 may select any one of the second trimming regions 322a and 322b in accordance with the feature of the object, for example, the eye region 312a being arranged in an approximately horizontal direction or inclination of the face.

Alternatively, the composition setting unit 112 may provide both information of the second trimming region 322a to be horizontally long and information of the second trimming region 322b to be vertically long to the trimming unit 113. In this case, the display control unit 115 may display both the trimming images 400a and 400b as preview images on the display unit 120 so that the user can select the stored trimming images. The configuration in which the shapes of the second trimming regions are switched to the horizontally long shape or the vertically long shape or both the trimming images are output to allow the user to select the trimming image may be applied to another example to be described herein.

In the generation process of the trimming image illustrated in FIGS. 4A to 4C, the first trimming region 320 is reduced and the second trimming region 322 is set. At this time, if the reduction amount of the first trimming region 320 is not appropriate, the trimming region in which the region which the user gazes at, for example, the region such as the eye region 312a of the face region 310a is cut halfway may be set. In this case, the user does not feel that the composition of the second trimming region is appropriate.

Therefore, in the example described above, the region such as the eye region 312a is set as the gaze region, the first trimming region 320 is reduced such that the gaze region is included, and the second trimming region 322 is set. Thereby, the possibility of the user feeling that the composition of the second trimming region 322 is appropriate can become high.

Second Example

Figure 5A:
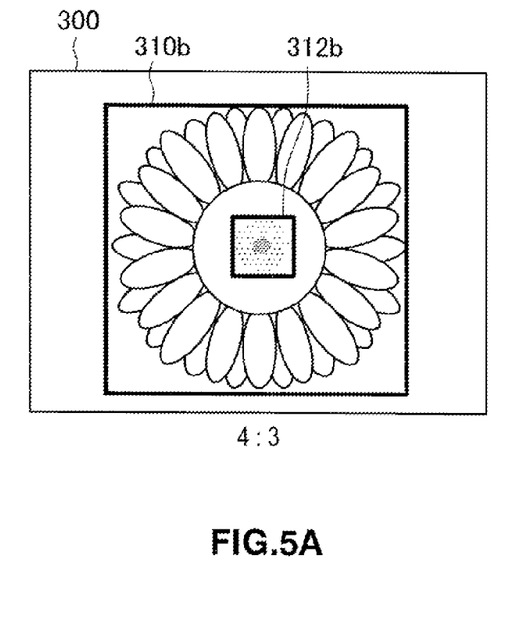
FIGS. 5A and 5B are diagrams illustrating a second example of trimming region setting in the first embodiment of the present disclosure.
Figure 5B:
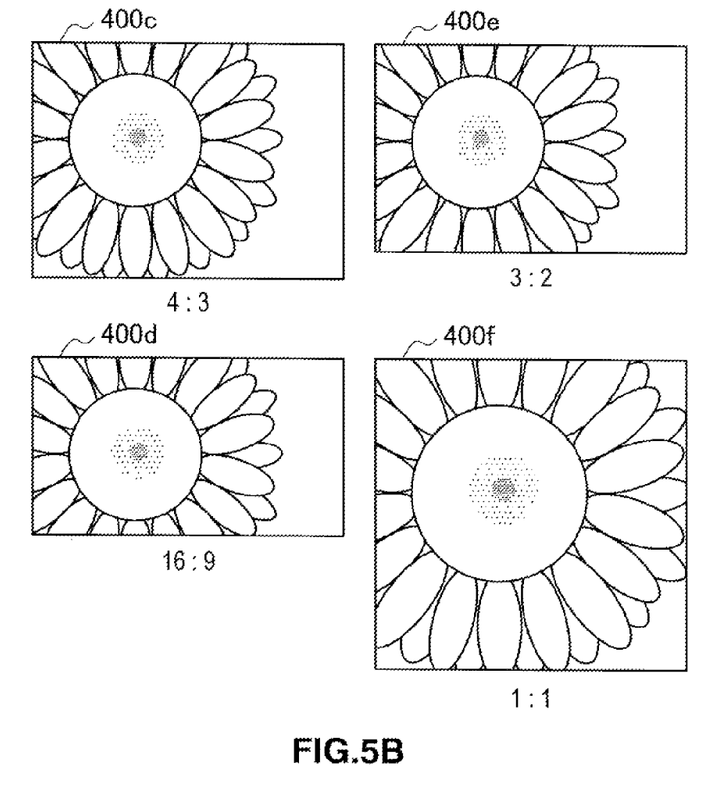

FIGS. 5A and 5B are diagrams illustrating a second example of trimming region setting in this embodiment. Different from the examples of FIGS. 3A to 4C, in the example of FIGS. 5A and 5B, the object recognizing unit 111 recognizes a flower as an object included in the input image 300. The flower may be recognized as a flower region 310b.

As illustrated in FIG. 5A, first, the composition setting unit 112 sets a first trimming region (not illustrated in the drawings) in which the flower region 310b is arranged with a three division composition. Because the flower region 310b is largely displayed on the input image 300, the first trimming region is beyond the range of the input image 300.

Therefore, the composition setting unit 112 reduces the first trimming region to set the second trimming region. Trimming images 400c to 400f that are obtained by trimming the input image in the second trimming region are illustrated in FIG. 5B.

In this example, the composition setting unit 112 analyzes the input image 300 to set a gaze region 312b and reduces the first trimming region such that the gaze region 312b is included. The gaze region 312b is, for example, a region in which brightness is higher, saturation is higher, or the number of edges is larger, in the flower region 310b.

The composition setting unit 112 may change an aspect ratio of the second trimming region in accordance with a feature of the object. FIG. 5B illustrates the trimming images 400 that are generated when the second trimming region is set with various aspect ratios. Among the trimming images 400, the trimming image 400c is obtained when an aspect ratio (4:3) of the input image is not changed. The trimming image 400d is obtained when the aspect ratio is changed to 16:9. The trimming image 400e is obtained when the aspect ratio is changed to 3:2. The trimming image 400f is obtained when the aspect ratio is changed to 1:1.

In the example illustrated in the drawings, all of the second trimming regions that have the individual aspect ratios are within the range of the input image 300. However, when the second trimming region having the certain aspect ratio is beyond the range of the input image 300, the composition setting unit 112 may exclude the second trimming region having the corresponding aspect ratio from selection objects. The composition setting unit 112 may select the second trimming region having any aspect ratio in accordance with the feature of the object, for example, the shape of the gaze region 312b.

Alternatively, the composition setting unit 112 may provide information of the second trimming regions having a plurality of aspect ratios to the trimming unit 113. In this case, the display control unit 115 may display each of the trimming images 400c to 400f as a preview image on the display unit 120 so that the user can select the stored trimming images. The configuration in which the aspect ratios of the second trimming images are switched or the plurality of trimming images are output to allow the user to select the trimming image may be applied to another example to be described herein.

In the generation process of the trimming image illustrated in FIGS. 5A and 5B, even when the gaze region in the object region like the eye region 312a with respect to the face region 310a in FIGS. 4A to 4C is not previously set, the gaze region 312b is set by analyzing the input image 300. Therefore, even in the case of an object such as a flower or a dish, the second trimming region can be set by appropriately setting the gaze region 312b.

When the aspect ratio of the second trimming region is switched, the aspect ratio of the trimming image is not fixed so that the trimming image can be generated in many cases. When the trimming images having the plurality of aspect ratios are provided to the user, various trimming images can be generated in accordance with the taste of the user.

Third Example

Figure 6A:
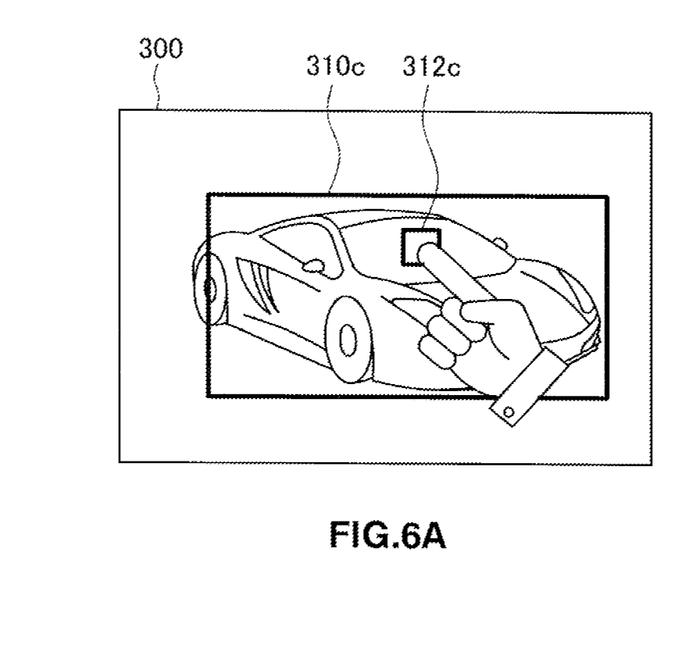
FIGS. 6A and 6B are diagrams illustrating a third example of trimming region setting in the first embodiment of the present disclosure.
Figure 6B:
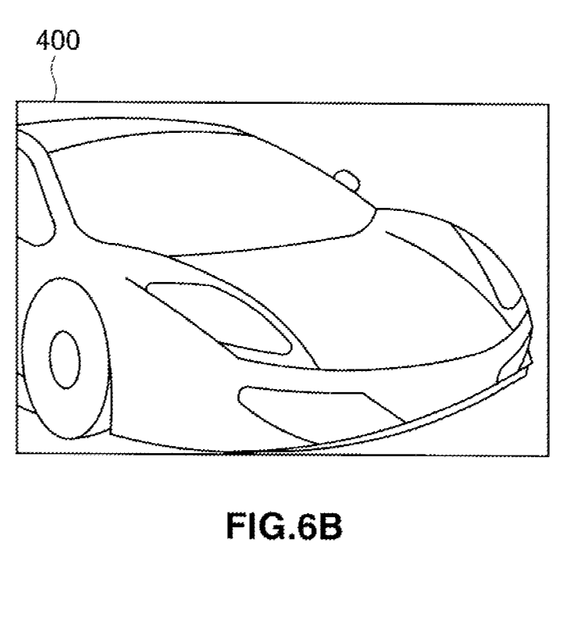

FIGS. 6A and 6B are diagrams illustrating a third example of trimming region setting in this embodiment. Different from the examples of FIGS. 3A to 5B, in the example of FIGS. 6A and 6B, the object recognizing unit 111 recognizes a vehicle as an object included in the input image 300. The vehicle may be recognized as a vehicle region 310c.

As illustrated in FIG. 6A, first, the composition setting unit 112 sets a first trimming region (not illustrated in the drawing) in which the vehicle region 310c is arranged with a three division composition. Because the vehicle region 310c is largely displayed on the input image 300, the first trimming region is beyond the range of the input image 300.

Therefore, the composition setting unit 112 reduces the first trimming region to set the second trimming region. A trimming image 400 that is obtained by trimming the input image in the second trimming region is illustrated in FIG. 6B.

In this example, the composition setting unit 112 sets a gaze region 312c by an operation from the user and reduces the first trimming region such that the gaze region 312c is included. The gaze region 312c may be a region near a gaze point in the vehicle region 310c designated by the operation from the user before the input image 300 is imaged. In this case, the object recognizing unit 111 may continuously recognize the vehicle region 310c of the object by tracking and move the designated gaze point to correspond to the tracking.

The gaze region 312c may be a region near a gaze point selected by the user from the input image 300 displayed on the display unit 120, when the user generates the trimming image 400 from the input image 300 displayed as a preview image or a reproduction image. That is, the gaze region 312c may be set after an image is imaged and recorded.

In the generation process of the trimming image illustrated in FIGS. 6A and 6B, the gaze region 312c is set by designation from the user. Therefore, even in the case of an object in which it is difficult to automatically detect a gaze region, an appropriate second trimming region can be set by setting the gaze region 312c in accordance with the desire of the user.

Fourth Example

Figure 7A:
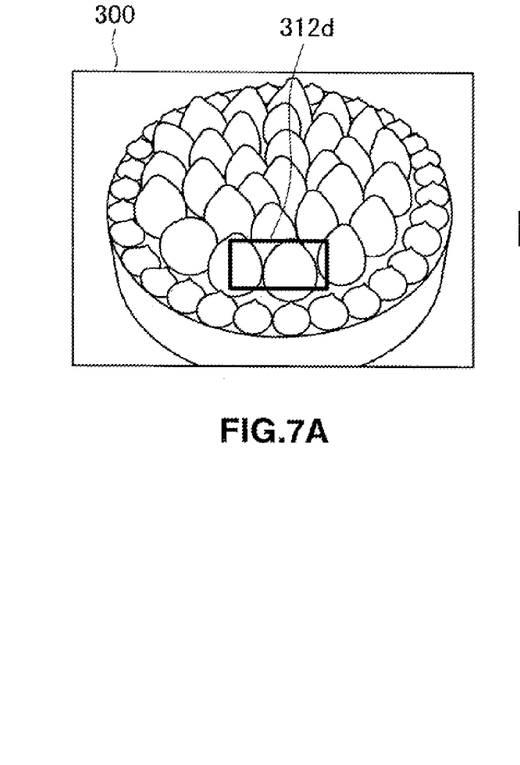
FIGS. 7A and 7B are diagrams illustrating a fourth example of trimming region setting in the first embodiment of the present disclosure.
Figure 7B:
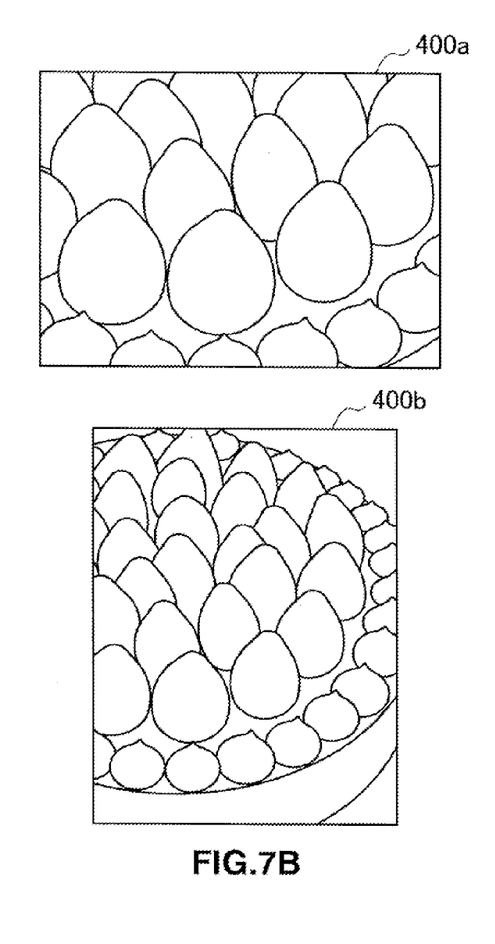

FIGS. 7A and 7B are diagrams illustrating a fourth example of trimming region setting in this embodiment. This example is an example of so-called macro photography. As illustrated in FIG. 7A, an object in the example is a cake which occupies most parts of the input image 300. Thus, the object is not recognized as the region like the examples of FIGS. 3A to 6B. The first trimming region in which the object is arranged with the three division composition by the composition setting unit 112 is beyond a range of the input image 300.

Therefore, the composition setting unit 112 sets the second trimming region. In the example illustrated in the drawings, the composition setting unit 112 sets the second trimming region such that a focus region 312d focused on in the input image is included. Specifically, the composition setting unit 112 may set the second trimming region in which the focus region 312d is arranged with the three division composition.

At this time, the composition setting unit 112 may set both or one of the second trimming region to be horizontally long and the second trimming region to be vertically long. Trimming images 400a and 400b that are generated in the individual cases are illustrated in FIG. 7B. The composition setting unit 112 may select any one of the second trimming region to be horizontally long and the second trimming region to be vertically long, according to a feature of the object, for example, a shape of the focus region 312d.

In the generation process of the trimming image illustrated in FIGS. 7A and 7B, the focus region 312d that is focused on in the input image is set to a gaze region. Therefore, even in the case of the macro photography in which the region of the object is beyond the range of the input image 300, the trimming region can be set by appropriately setting the gaze region.

2. Second Embodiment

Figure 8:
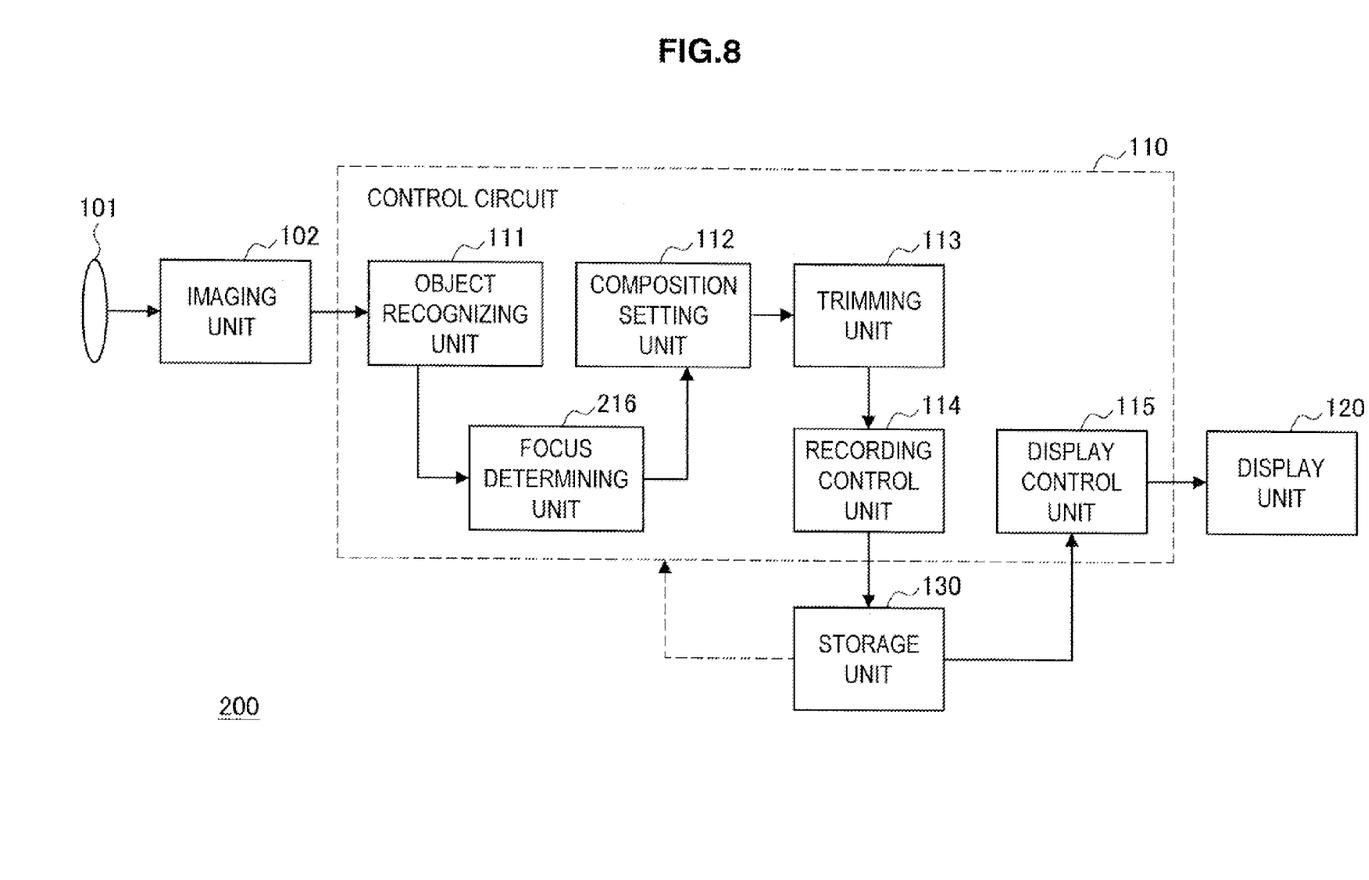
FIG. 8 is a schematic block diagram illustrating a functional configuration of a digital still camera according to a second embodiment of the present disclosure.
Figure 9:
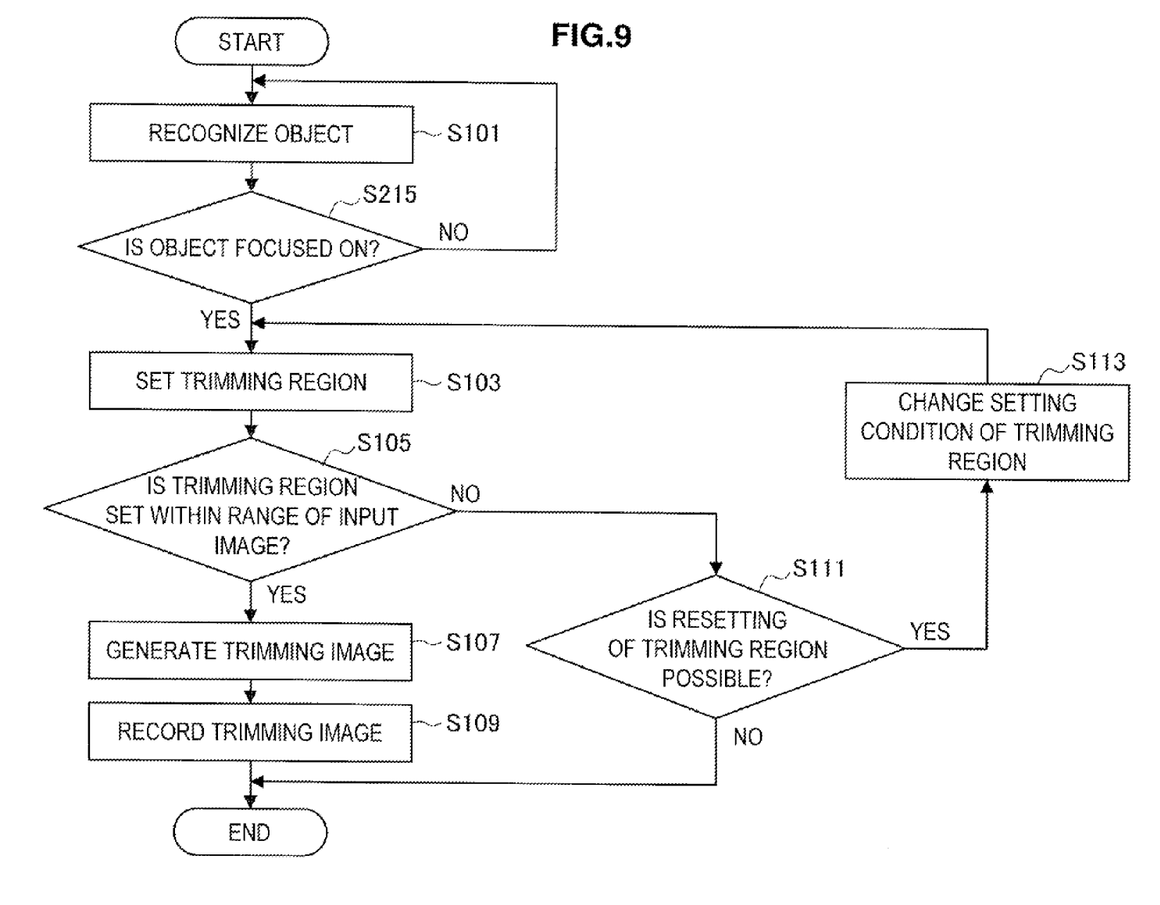
FIG. 9 is a flowchart illustrating a process of the digital still camera according to the second embodiment of the present disclosure.

Next, a second embodiment of the present disclosure will be described with reference to FIGS. 8 and 9. FIG. 8 is a schematic block diagram illustrating a functional configuration of a digital still camera 200 according to this embodiment. FIG. 9 is a flowchart illustrating a process of the digital still camera 200.

The second embodiment is different from the first embodiment in that the digital still camera 200 further includes a focus determining unit 216. However, because the other configuration of the second embodiment is the same as that of the first embodiment, detailed explanation thereof is omitted.

As illustrated in FIG. 8, in this embodiment, the digital still camera 200 includes the focus determining unit 216. The focus determining unit 216 determines whether an object recognized by the object recognizing unit 111 is focused on. The focus determining unit 216 determines whether the object is focused on, using the same method as automatic focusing, such as a contrast detection method or a phase difference detection method. For example, when the contrast detection method is used, the focus determining unit 216 determines whether a contrast in the region of the object of the input image is equal to or more than a predetermined threshold value or is more than a contrast in the other region and determines whether the object is focused on. When the phase difference detection method is used, the focus determining unit 216 determines whether a lens of the imaging optical system 101 is focused on the object, on the basis of a phase difference in the region of the object detected using a light measurement sensor (not illustrated in the drawings) such as a line sensor, and determines whether the object is focused on.

In this case, the focus determining unit 216 provides a determination result on whether the object is focused on to the composition setting unit 112. The composition setting unit 112 sets the first trimming region, when it is determined that the object is focused on as the determination result in the focus determining unit 216. Meanwhile, when it is determined that the object is not focused on, the setting process of the trimming region that has been described in the first embodiment is not executed. When the region recognized as the object is focused on entirely, the focus determining unit 216 may determine that the object is focused on. When at least a part of the region recognized as the object is focused on, the focus determining unit 216 may determine that the object is focused on.

In FIG. 9, the process of the focus determining unit 216 is illustrated as step S215. After the object recognizing unit 111 recognizes the object in step S101, the focus determining unit 216 determines whether the recognized object is focused on (step S215). In this case, when it is determined that the object is focused on, the setting process of the trimming region after step S103 is executed. Meanwhile, when it is determined that the object is not focused on, the process returns to step S101.

In the second embodiment described above, when the object is focused on, the process of setting the trimming region is executed. When the object is focused on, precision of the composition setting becomes high. When the object is not focused on, even though the trimming image is generated in the trimming region, a corresponding operation may be failed after all. That is, according to the configuration of this embodiment, a trimming image not desired by the user can be prevented from being generated and a trimming image desired by the user can be generated with high precision.

3. Supplement

The embodiments of the present disclosure are not limited to the configurations described above and may be variously modified like the following example.

For example, the image processing apparatus according to the embodiment of the present disclosure is not limited to the digital still camera and may be a mobile phone (smart phone) having an imaging function or a portable terminal such as a tablet personal computer (PC). The image processing apparatus may be an information processing apparatus such as a desktop PC that does not have an imaging function. In this case, the image processing apparatus acquires an image imaged by another apparatus as an input image.

It should be understood by those skilled in the art that various modifications, combinations, sub-combinations and alterations may occur depending on design requirements and other factors insofar as they are in the scope of the appended claims or the equivalents thereof.

Additionally, the present technology may also be configured as below.

(1) An image processing apparatus including:
a composition setting unit that, when a first trimming region in which an object included in an input image is arranged with a first composition is beyond a range of the input image, sets a second trimming region in which the object is arranged with a second composition.

(2) The image processing apparatus according to (1),
wherein the second trimming region is smaller than the first trimming region.

(3) The image processing apparatus according to (2),
wherein the composition setting unit reduces the first trimming region to set the second trimming region such that a predetermined region of the object is included.

(4) The image processing apparatus according to (3),
wherein the predetermined region is set by an operation from a user.

(5) The image processing apparatus according to (3),
wherein the predetermined region is set by analyzing the input image.

(6) The image processing apparatus according to (3),
wherein the object is a face, and
wherein the predetermined region is a region corresponding to a predetermined organ included in the face.

(7) The image processing apparatus according to any one of (1) to (6),
wherein at least one of the first composition or the second composition is a three division composition.

(8) The image processing apparatus according to (7),
wherein the composition setting unit switches a shape of the second trimming region to a horizontally long shape or a vertically long shape in accordance with a feature of the object.

(9) The image processing apparatus according to (7) or (8),
wherein the composition setting unit changes an aspect ratio of the second trimming region in accordance with a feature of the object.

(10) The image processing apparatus according to any one of (7) to (9),
wherein the composition setting unit sets the second trimming region such that a region focused on in the input image is included.

(11) The image processing apparatus according to any one of (1) to (10),
wherein a type of the second composition is different from a type of the first composition.

(12) The image processing apparatus according to any one of (1) to (11), further including:
a focus determining unit that determines whether the object is focused on,
wherein the composition setting unit sets the first trimming region, when the object is focused on.

(13) The image processing apparatus according to any one of (1) to (12),
wherein the composition setting unit sets a third trimming region in which the object is arranged with a third composition, when the second trimming region is beyond the range of the input image.

(14) The image processing apparatus according to (13), further including:
a trimming unit that generates a trimming image of the second trimming region or the third trimming region from the input image and expands the trimming image to a size of the input image by performing a process of pixel interpolation to increase resolution,
wherein the composition setting unit sets the second trimming region or the third trimming region, when expansion of the trimming image is possible.

(15) An image processing method including:
when a first trimming region in which an object included in an input image is arranged with a first composition is beyond a range of the input image, setting a second trimming region in which the object is arranged with a second composition.

(16) A computer readable recording medium on which a program is recorded,
wherein the program causes a computer to realize a function of, when a first trimming region in which an object included in an input image is arranged with a first composition is beyond a range of the input image, setting a second trimming region in which the object is arranged with a second composition.

What is claimed is:

1. An image processing apparatus comprising:
a central processing unit (CPU) programmed such that during operation, when a first trimming region in which an object included in an input image is arranged with a first composition is beyond a range of the input image, sets a second trimming region in which the object is arranged with a second composition,
in which a type of one of the first composition or the second composition is a three division composition wherein the respective one of the first trimming region or the second trimming region is divided by three in a first direction and in a second direction different from the first direction so as to form four intersections of lines each representing a location at which the object is arrangeable, and
in which a type of the other one of the first composition or the second composition is a two division composition wherein the associated one of the first trimming region or the second trimming region is divided by two in the first direction and in the second direction so as to form one intersection of lines representing a location at which the object is arrangeable.

2. The image processing apparatus according to claim 1, wherein the second trimming region is smaller than the first trimming region.

3. The image processing apparatus according to claim 2, wherein the CPU reduces the first trimming region to set the second trimming region such that a predetermined region of the object is included.

4. The image processing apparatus according to claim 3, wherein the predetermined region is set by an operation from a user.

5. The image processing apparatus according to claim 3, wherein the predetermined region is set by analyzing the input image.

6. The image processing apparatus according to claim 3, wherein the object is a face, and
wherein the predetermined region is a region corresponding to a predetermined organ included in the face.

7. The image processing apparatus according to claim 1, wherein the CPU switches a shape of the second trimming region to a horizontally long shape or a vertically long shape in accordance with a feature of the object.

8. The image processing apparatus according to claim 1, wherein the CPU changes an aspect ratio of the second trimming region in accordance with a feature of the object.

9. The image processing apparatus according to claim 1, wherein the CPU sets the second trimming region such that a region focused on in the input image is included.

10. The image processing apparatus according to claim 1, in which the CPU during operation determines whether the object is focused on, and
sets the first trimming region, when the object is focused on.

11. The image processing apparatus according to claim 1, wherein the CPU sets a third trimming region in which the object is arranged with a third composition, when the second trimming region is beyond the range of the input image.

12. An image processing apparatus comprising:
a central processing unit (CPU) programmed such that during operation
(i) when a first trimming region in which an object included in an input image is arranged with a first composition is beyond a range of the input image, sets a second trimming region in which the object is arranged with a second composition, (ii) sets a third trimming region in which the object is arranged with a third composition, when the second trimming region is beyond the range of the input image, and (iii) generates a trimming image of the second trimming region or the third trimming region from the input image and expands the trimming image to a size of the input image by performing a process of pixel interpolation to increase resolution, wherein the second trimming region or the third trimming region is set, when expansion of the trimming image is possible.

13. An image processing method comprising:

when a first trimming region in which an object included in an input image is arranged with a first composition is beyond a range of the input image, setting by use of a central processing unit (CPU) a second trimming region in which the object is arranged with a second composition, in which a type of one of the first composition or the second composition is a three division composition wherein the respective one of the first trimming region or the second trimming region is divided by three in a first direction and in a second direction different from the first direction so as to form four intersections of lines each representing a location at which the object is arrangeable, and in which a type of the other one of the first composition or the second composition is a two division composition wherein the associated one of the first trimming region or the second trimming region is divided by two in the first direction and in the second direction so as to form one intersection of lines representing a location at which the object is arrangeable.

14. A non-transitory computer readable recording medium on which a program is recorded, wherein when executed the program causes a computer to realize a function of, when a first trimming region in which an object included in an input image is arranged with a first composition is beyond a range of the input image, setting a second trimming region in which the object is arranged with a second composition, in which a type of one of the first composition or the second composition is a three division composition wherein the respective one of the first trimming region or the second trimming region is divided by three in a first direction and in a second direction different from the first direction so as to form four intersections of lines each representing a location at which the object is arrangeable, and in which a type of the other one of the first composition or the second composition is a two division composition wherein the associated one of the first trimming region or the second trimming region is divided by two in the first direction and in the second direction so as to form one intersection of lines representing a location at which the object is arrangeable.

* * * * *

UNITED STATES PATENT AND TRADEMARK OFFICE
CERTIFICATE OF CORRECTION

PATENT NO. : 8,971,662 B2  
APPLICATION NO. : 13/743845  
DATED : March 3, 2015  
INVENTOR(S) : Yoko Fukata, Toshiki Ono and Masanori Mikami Page 1 of 1

It is certified that error appears in the above-identified patent and that said Letters Patent is hereby corrected as shown below:

Title page, item (54) and in the Specification, col. 1, line 1, "IMAGE PROCESSING APPARATUS, IMAGE PROCESSING METHOD, AND RECORDING MEDIUM" should read --APPARATUS AND METHOD FOR GENERATING A TRIMMING IMAGE FROM AN ACQUIRED IMAGE--.

Signed and Sealed this  
Fourth Day of August, 2015

Michelle K. Lee  
*Director of the United States Patent and Trademark Office*